(12) United States Patent
Kaiser-Krug et al.

(10) Patent No.: US 11,867,289 B2
(45) Date of Patent: Jan. 9, 2024

(54) FOLDABLE SEAL WITH CONTINUOUS SEALING CONTOUR

(71) Applicant: Reinz-Dichtungs-GmbH, Neu-Ulm (DE)

(72) Inventors: Sina Kaiser-Krug, Ulm (DE); Wolfgang Kraus, Neu-Ulm (DE); Frank Pfau, Krumbach (DE); Andreas Ruopp, Merklingen (DE); Sebastian Scheeler, Stuttgart (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 111 days.

(21) Appl. No.: 17/594,330

(22) PCT Filed: Apr. 8, 2020

(86) PCT No.: PCT/EP2020/060053
§ 371 (c)(1),
(2) Date: Oct. 11, 2021

(87) PCT Pub. No.: WO2020/208087
PCT Pub. Date: Oct. 15, 2020

(65) Prior Publication Data
US 2022/0154825 A1     May 19, 2022

(30) Foreign Application Priority Data
Apr. 12, 2019  (DE) ..................... 20 2019 102 113.6

(51) Int. Cl.
*F16J 15/02*   (2006.01)
*H01M 50/262*  (2021.01)
(Continued)

(52) U.S. Cl.
CPC ......... *F16J 15/022* (2013.01); *H01M 50/204* (2021.01); *H01M 50/24* (2021.01); *H01M 50/262* (2021.01)

(58) Field of Classification Search
CPC .......... F16J 15/106; F16J 15/022; F16J 15/02; H01M 50/24; H01M 50/262; H01M 50/204
See application file for complete search history.

(56) References Cited

U.S. PATENT DOCUMENTS 3,342,501 A * 9/1967 Meyer ............... B29C 45/14344
277/639
3,720,420 A * 3/1973 Jelinek .................. F16J 15/104
277/611
(Continued)

FOREIGN PATENT DOCUMENTS

DE         20021017 U1 *  2/2001  ............ F02F 11/002
DE      102005013813 A1   9/2006
(Continued)

OTHER PUBLICATIONS

ISA European Patent Office, International Search Report Issued in Application No. PCT/EP2020/060053, dated Jul. 13, 2020, WIPO, 4 pages.

*Primary Examiner* — Eugene G Byrd
(74) *Attorney, Agent, or Firm* — McCoy Russell LLP (57) ABSTRACT

A seal, in particular a gasket, for sealing with at least one sealing layer a gap in a housing that extends around an inner chamber of the housing. In particular, a frame seal which seals between a lower part and an upper part of the housing, for example a motor vehicle battery housing or a motor vehicle battery box housing.

17 Claims, 9 Drawing Sheets

(51) Int. Cl.
*H01M 50/24* (2021.01)
*H01M 50/204* (2021.01)

(56) References Cited

U.S. PATENT DOCUMENTS

| | | | | |
|---|---|---|---|---|
| 3,738,670 | A | 6/1973 | Jelinek et al. | |
| 5,024,863 | A * | 6/1991 | Gibbon | C08J 7/0427 |
| | | | | 264/129 |
| 6,669,205 | B2 * | 12/2003 | Schenk | F16J 15/127 |
| | | | | 277/630 |
| 11,621,453 | B2 * | 4/2023 | Ruopp | F16J 15/122 |
| | | | | 429/185 |
| 2005/0046121 | A1 * | 3/2005 | Jones | F16J 15/122 |
| | | | | 277/594 |
| 2006/0290073 | A1 * | 12/2006 | Peterson | F16J 15/121 |
| | | | | 277/591 |
| 2010/0143076 | A1 * | 6/2010 | Matsumoto | F16J 15/104 |
| | | | | 411/533 |
| 2011/0140374 | A1 * | 6/2011 | Dubiel | F16J 15/061 |
| | | | | 277/628 |
| 2012/0187638 | A1 * | 7/2012 | Bauer | F16J 15/108 |
| | | | | 264/261 |
| 2017/0074401 | A1 * | 3/2017 | Saxton | F16J 15/022 |
| 2017/0321831 | A1 * | 11/2017 | Nahrwold | F16L 23/18 |
| 2019/0024796 | A1 * | 1/2019 | Amano | F16J 15/102 |
| 2019/0078687 | A1 * | 3/2019 | Takeuchi | F16L 23/18 |
| 2019/0128364 | A1 * | 5/2019 | Kim | F16H 57/025 |
| 2019/0162307 | A1 * | 5/2019 | Kamm | F16J 15/0818 |
| 2019/0293180 | A1 * | 9/2019 | Oricchio, Jr. | F16J 15/104 |
| 2020/0277115 | A1 * | 9/2020 | Mithani | F16J 15/064 |
| 2020/0286694 | A1 * | 9/2020 | Motoki | F16J 15/062 |
| 2020/0386313 | A1 * | 12/2020 | Hwang | F16J 15/0818 |
| 2021/0143502 | A1 * | 5/2021 | Yanagi | H01M 10/0413 |
| 2021/0180697 | A1 * | 6/2021 | Chiproot | F16J 15/027 |
| 2021/0396316 | A1 * | 12/2021 | Hagiwara | F16J 15/122 |
| 2021/0404556 | A1 * | 12/2021 | Hagiwara | F16J 15/064 |
| 2022/0209627 | A1 * | 6/2022 | Vuong | H02K 5/203 |

FOREIGN PATENT DOCUMENTS

| | | | | |
|---|---|---|---|---|
| JP | | 10077464 A * | 3/1998 | F16J 15/104 |
| JP | | 2005214222 A | 8/2005 | |
| WO | WO-2019211303 A1 * | 11/2019 | | F16J 15/061 |

* cited by examiner

FOLDABLE SEAL WITH CONTINUOUS SEALING CONTOUR

CROSS-REFERENCE TO RELATED APPLICATIONS

The present application is a U.S. National Phase of International Application No. PCT/EP2020/060053, entitled "FOLDABLE SEAL WITH CONTINUOUS SEALING CONTOUR", and filed on Apr. 8, 2020. International Application No. PCT/EP2020/060053 claims priority to German Utility Model Application No. 20 2019 102 113.6, entitled "FOLDABLE SEAL WITH CONTINUOUS SEAL CONTOUR", and filed on Apr. 12, 2019. The entire contents of the above-listed applications are hereby incorporated by reference for all purposes.

TECHNICAL FIELD

The present invention relates to a seal, in particular a gasket, for sealing with at least one sealing layer a gap in a housing that extends around an inner chamber of the housing. In particular, the present invention relates to a frame seal which seals between a lower part and an upper part of the housing, for example a motor vehicle battery housing or a motor vehicle battery box housing.

BACKGROUND AND SUMMARY

A circumferential gap in a housing, between a lower part and an upper part of the housing, for example a battery box trough and a battery box lid of a battery box, is traditionally sealed by adhesively bonding the upper part to the lower part in the gap. However, this has the disadvantage that the housing can be dismantled again and then sealingly re-assembled only with difficulty. As an alternative, therefore, seals are also placed in the gap circumferentially along the edge of the lower part before the lid is detachably fastened, for example by screwing. To this end, use is often made of circumferential elastomeric seals. One disadvantage of these is that, due to the flexibility and deformability of the seal as a whole, the assembly is not very secure or the assembly effort is increased since, for example, a suitable groove for the elastomeric seal must be cut or cast into the housing.

On the other hand, housings such as battery boxes often have large dimensions, and therefore the lower part closed by the upper part has lengths and/or widths of more than one meter. By way of example, battery boxes for traction batteries in the vehicle are typically provided with dimensions of more than 1.3 m in length and more than 0.8 m in width.

In this case, therefore, pure elastomeric seals have the disadvantage that they may be incorrectly positioned during assembly or may slip, and therefore the assembly is not very secure. On the other hand, traditional one-part frame seals comprising a continuous metal or plastic support, onto which a rubber sealing lip is injection-moulded as a sealing contour, can be manufactured in the required dimensions only with difficulty. In this case, very large tools are required in order to manufacture the support. Furthermore, a significant amount of material is wasted. In addition, a great deal of effort is involved in transport and assembly.

Proceeding from this prior art, the object of the present invention is therefore to provide an improved seal for sealing housings, which overcomes the aforementioned disadvantages.

This object is achieved by the subjects of the independent claims. Advantageous developments will become apparent from the dependent claims, the description and the figures.

The present invention therefore provides a seal, in particular a gasket, for sealing a gap in a housing. Such a gap may be, for example, the circumferential gap between a box and a lid of the housing, for example a battery box. When used as intended, a seal of the type described below is arranged in the gap, for example between the trough and the lid of the housing, i.e. circumferentially along the gap between said parts. The seal therefore preferably has, as will be explained in greater detail below, an opening which largely corresponds to the dimensions of the inner chamber of the housing in the plane of the seal and which is largely or entirely surrounded by the seal. The term "largely" can thus be understood to mean at least partially, i.e. partially, preferably mostly, and particularly preferably entirely. The opening can also be referred to as an aperture and/or cutout. The seal or gasket therefore serves to seal with at least one sealing layer the gap that extends around the inner chamber of the housing.

The sealing layer, which is preferably a flat, but not necessarily entirely planar sealing layer, in this case has at least two hard components which are connected by a connecting soft component that is soft in comparison to the hard components, which connecting soft component can also be referred to as the first soft component. At least in each case at least one (first) partial sealing contour formed on the hard components by a respective sealing soft component, which can also be referred to as the second soft component, forms a continuous sealing contour with at least one (second) partial sealing contour formed by the connecting soft component. The second soft component is likewise soft in comparison to the hard components and may for example be made of the same material or contain the same materials as the first soft component.

The hard component may be provided with a coating on one or both of its flat surfaces (extending in the main extension plane of the seal, which may for example correspond to the neutral fibre of the hard components, or parallel thereto), which coating is preferably formed in one piece with the sealing soft component.

The continuous sealing contour is formed by the partial sealing contours of the respective soft components merging into one another. It is particularly advantageous if the partial sealing contours merge seamlessly into one another. Therefore, along the sealing layer, at least one continuous sealing contour is provided, which extends over the at least two hard components and the at least one connecting soft component so that both the hard components with their respectively associated sealing soft components and the connecting soft component perform a sealing effect by virtue of the respective partial sealing contours.

This has the advantage that the seal can be folded at the connecting soft component(s) so that even large-format seals, which may have length by width dimensions of more than 1.4 m×0.8 m or more than 2 m×1 m, can be produced more easily since the respective hard components can be produced separately in a first step and can be connected by the connecting soft component in a second step. The second step need not be carried out simultaneously for all the connecting soft components that are present, but rather may also take place sequentially for the different connecting soft components. Said large-format seals or sealing components can thus also be produced using smaller and therefore less expensive machines and tools. Accordingly, the handling during the production process is also made easier, and the logistics are simplified due to the reduced transport volume in the folded state. Damage during transport can thus also be avoided. In addition, said seals are reusable and no complicated groove is required in the components for the insertion of shaped rubber seals. The aforementioned advantages can also be applied to seals that can be pieced together, which are mounted piece-by-piece on a housing and perform their desired effect only as a complete unit, when all the pieces of the seal are mounted on the housing. This can be achieved for example by using a plurality of the above-described open, foldable seals as pieces of a seal.

The sealing layer may also have one or more further sealing contours, which are then in each case formed, like the described continuous sealing contour, by the partial sealing contours of the sealing soft component and of the connecting soft component. The further continuous one or more sealing contours may in this case extend along the first continuous sealing contour, for example parallel to the latter. The further partial sealing contours may be formed in the same sealing layer on the same hard and soft components and/or on the hard and soft components of a further sealing layer of the seal. The sealing behavior of the seal can thus be adapted to desired properties. It is particularly advantageous if a single-layer or multi-layer gasket has such a sealing contour both on its inner edge and on its outer edge. In regions closest to one another, the outer and inner edge may be oriented in opposite directions.

In one advantageous embodiment, it is provided that the respective sealing soft components are applied to the associated hard component by an injection moulding process, and the connecting soft component is applied to both hard components and/or to the respective sealing soft components by an injection moulding process. This has the advantage that a reliable connection between the different components is achieved in a manner that is simple in terms of manufacture, and the continuous sealing contour can be created by partial sealing contours which merge into one another. In this case, the hard components and/or the sealing soft components that extend along the hard components may be at least partially overmoulded in respective fastening portions of the seal by the sealing soft components and/or by the connecting soft component.

In another advantageous embodiment, it is provided that the hard components are partially or entirely made of a metal and/or a thermoplastic and/or a thermoset, and the soft components are partially or entirely made of an elastomer or different elastomers or blends (mixtures) of elastomers. Here, preference is given to metal supports, in particular sheet metal, for example steel—such as mild steel, carbon steel or stainless steel—or aluminium alloys. This has the advantage of a particularly high degree of robustness and thus improved sealing performance and reusability.

The elastomer may be or contain an acrylonitrile butadiene rubber and/or an ethylene propylene diene rubber and/or an ethyl-vinyl acetate copolymer and/or a polyacrylate rubber and/or an ethylene acrylate rubber and/or a hydrogenated acrylonitrile butadiene rubber and/or a vinyl methyl silicone and/or a phenyl silicone and/or a phenyl vinyl methyl silicone and/or a fluoro vinyl methyl silicone and/or a fluoropolymer rubber. The aforementioned elastomers lead to a particularly reliable sealing behaviour of the sealing contour, which is maintained even upon repeated deformation of the seal, such as folding for example.

The thermoplastic may be or contain a polyphenylene sulphide and/or a polyetherimide and/or a polyimide and/or a polyphthalamide and/or a polyether ether ketone and/or a polyamide.

As an alternative or in addition, the thermoset may be or contain a polyester resin and/or a vinyl ester resin and/or an epoxy resin and/or a phenolic resin and/or a melamine formaldehyde resin. The aforementioned thermoplastics and thermosets are particularly advantageous for serving as supports for the seal and thus for the sealing contour.

It is particularly advantageous if the seal or at least one of the components thereof has self-extinguishing and/or flame-retardant properties. This may be achieved for example in that a high proportion of non-combustible fillers is used, and/or at least one of the aforementioned silicones is used as the elastomer, and/or a flame retardant is added to the soft component, or the hard component is equipped with a flame retardant. As non-combustible fillers, use may in particular be made of metal oxides and/or metal hydroxides, in particular aluminium hydroxide, and/or metal carbonates and/or silicates.

In another advantageous embodiment, it is provided that the hard components are flat, i.e. in a cross-section perpendicular to the main extension plane of the seal and perpendicular to a local course of the seal the width of the hard components is a multiple of the thickness of the hard components, for example more than five times or more than ten times the thickness of the hard components, so that a respective edge, i.e. an inner or outer edge, is present on an inner side of the hard component, facing towards the opening, and on an outer side of the hard component, facing towards the exterior. This edge may also be or comprise a rounded edge. The partial sealing contours formed by the sealing soft components extend in each case along a first edge, for example the outer edge, of the associated hard component preferably only over a portion of the edge, i.e. not over the entire length of the edge. The partial sealing contour formed by the connecting soft component accordingly extends along the first edge over a remaining residual portion of the edge. The partial sealing contours therefore preferably extend parallel to the edge; the transition takes place in particular at the edge of the respective hard component or a few millimeters offset therefrom. As an alternative or in addition, corresponding second partial sealing contours, which jointly form a second continuous sealing contour, may for example extend along corresponding second portions of the second edge, for example along the inner edge.

The sealing contours on the outer edge and inner edge may be identical or substantially identical; this leads to a particularly even compression behavior, as a result of which particularly uniform sealing can be achieved. However, it is also possible to form sealing contours with different properties on the two edges, in order for example to achieve a particularly secure seal by way of a double profile on the outer edge, while a single profile may be applied towards the inner chamber, i.e. on the inner edge. In particular, different materials may also be used for the sealing contour on the inner edge and the sealing contour on the outer edge.

Furthermore, it is possible that the connecting soft component is injection-moulded onto at least two differently oriented surfaces, namely onto the edge outer edge and/or inner edge extending along the course of the seal and onto a surface of an end edge of the hard component that is oriented transversely to the course of the seal. The connecting soft component thus engages around the respective hard components in a corresponding end region, which leads to increased stability. This is particularly advantageous in the case of seals which are not closed in an annular manner.

In another advantageous embodiment, it is provided that a first material transition, i.e. a first change of material between hard component and connecting soft component, and/or a second material transition between connecting soft component and sealing soft component extends at an angle other than 90° relative to the course of the sealing contour and/or relative to the main extension plane of the seal, preferably an angle of less than 60°, particularly preferably less than 45°. This has the advantage that the sealing contour is only minimally influenced by the material transition, which improves the sealing performance.

In another advantageous embodiment, it is provided that a length of the connecting soft component in the extension thereof connecting the end edges of hard components along the course of the sealing contour in the main extension plane of the seal is at least 20 mm, preferably at least 30 mm, preferably at least 40 mm, preferably at least 50 mm. It may also be provided that the length of the connecting soft component between the end edges of the hard components adjoining it is no more than 150 mm or 100 mm. This has the advantage that the desired flexibility, in particular the foldability, is achieved, but at the same time the stability created by the hard components is largely preserved. The length of the connecting soft component may also designate a spacing of the associated hard components.

Furthermore, it is advantageous if the connecting soft component between two hard components is at least 5 times, preferably at least 8 times, preferably at least 10 times as wide as the sealing soft component on an edge of a hard component. It is also advantageous if the connecting soft component between two hard components is at most 100 times, preferably at most 60 times as wide as the sealing soft component on an edge of a hard component.

The width of the seal or if a sealing contour is present on both edges of the seal the spacing between the two outer edges of these sealing contours preferably changes over the course of the seal at most such that the narrowest portion has a width that is at least 50%, preferably at least 70%, preferably at least 90% of the width of the widest portion. In particular, the width barely changes between portions in which the hard component is the support and portions in which the soft component is the support.

In one preferred embodiment, the partial sealing contour formed from the connecting soft component on an inner or outer edge of a hard component consists of three portions or has at least three portions. Starting from the soft component, the partial sealing contour formed from the connecting soft component initially extends in particular directly along the relevant edge of the hard component. This portion will hereinafter be referred to as the residual portion and extends at least 2 mm along the relevant edge. This region is usually adjoined by a region in which the sealing soft component is applied directly to the relevant edge, the sealing soft component in this portion being surrounded on its outer surfaces, which do not point towards the relevant edge, by the connecting soft component. The transition may for example extend diagonally (for example diagonally to the main extension plane of the seal and/or to the surface of the hard component at the nearest edge), and therefore this portion will be referred to here as the diagonal region and usually extends over 5 to 15 mm. However, the transition need not necessarily extend with a constant decrease in height (for example perpendicular to the main extension plane of the seal and/or to the surface of the hard component at the nearest edge) or/or width (for example parallel to the main extension plane of the seal) of the connecting soft component and with a constant increase in height and/or width of the sealing soft component; other decreases and increases are also possible, as long as the overall profile does not change significantly. This diagonal region is adjoined by a region in which the outer surface of the sealing soft component is still entirely surrounded by the connecting soft component, wherein the thickness of the connecting soft component decreases further. For a stable connection of the two soft components, however, the degree of decrease is much lower than in the diagonal region. This last region of the transition will be referred to here as the shell region and usually likewise extends over 5 to 15 mm.

In another advantageous embodiment, in which an aluminium alloy is used as the hard component, it is provided that a thickness of the sealing layer perpendicular to the main extension plane of the seal in the region of the sealing contours, in particular a thickness of the sealing and of the connecting soft components, is between 1.5 mm and 2.2 mm, and/or a thickness of the sealing layer in the region outside of the sealing contours, in particular a thickness of the hard component, is between 1.0 mm and 2.0 mm. In another advantageous embodiment, in which steel is used as the hard component, it is provided that a thickness of the sealing layer perpendicular to the main extension plane of the seal in the region of the sealing contours, in particular a thickness of the sealing and of the connecting soft components, is between 2.0 mm and 4.4 mm, and/or a thickness of the sealing layer in the region outside of the sealing contours, in particular a thickness of the hard component, is between 1.8 mm and 4.0 mm. These dimensions have proven to be particularly advantageous here for the stability and sealing behavior of the seal.

In another advantageous embodiment, it is provided that, outside of the sealing contours, a thickness of the connecting soft component perpendicular to the main extension plane of the seal is between 50% and 110%, preferably between 50% and 100%, of the thickness of the hard component. This relative size has also proven to be particularly advantageous for the properties of the seal.

In another advantageous embodiment, it is provided that, in the non-folded state of the seal, there is no contact in the circumferential direction between hard components located closest to one another; the hard components located closest to one another are thus separated from one another over their entire width by a connecting soft component.

In another advantageous embodiment, it is provided that, in the non-folded state of the seal, there is no contact in the circumferential direction between sealing soft components located closest to one another on the same sealing edge; the sealing soft components located closest to one another are thus separated from one another other over their entire width by a connecting soft component.

In another advantageous embodiment, the two aforementioned embodiments are combined with one another such that the connecting soft component extends over the entire width of the seal, i.e. both the sealing soft components located closest to one another in the circumferential direction on the first sealing edge and the sealing soft components located closest to one another in the circumferential direction on the second sealing edge are in each case separated by the connecting soft component.

In the folded-together state, however, in the three aforementioned embodiments, contact may also occur between the elements that do not touch one another in the unfolded state.

In another advantageous embodiment, it is provided that the hard component has a plurality of through-openings for respective fastening means, such as screws for example. The through-openings may accordingly be provided for fastening means which connect the two housing parts through the seal, but on the other hand also for fastening means which are intended for one-sided connection of the seal to one of the parts of the housing, which is advantageous for example in the case of pre-assembling the seal on one of the parts of the housing. Besides screws and bolts, use may also be made for example of clips or fastening pins having a flexible shaft, in particular made of plastic. On the one hand, the seal can thus be pre-assembled particularly easily on the associated housing; on the other hand, when the housing parts are thus connected through the seal, a uniform pressure on the sealing contours is achieved, especially if two are present, and space can also be saved.

It is also possible that the seal itself has cantilevered elements which are used for pre-assembly on one or both housing parts. In this case, such elements may in particular be formed from the soft component. They may extend directly out of the (rest of the) soft component, i.e. substantially perpendicular to the main extension plane of the gasket. If the hard component has an elastomeric coating, such a pre-assembly element may also be (integrally) formed from this coating or on this coating.

In one particularly advantageous embodiment, it is provided that the sealing layer is a sealing layer which extends around an opening of the seal and/or an inner chamber of a housing and has at least two connecting soft components, so that the continuous sealing contour is a sealing contour which extends around the opening of the seal and/or the inner chamber of the housing. As a result, a one-part seal can be provided in a particularly large format, which can nevertheless be easily manufactured and transported, and in addition is reusable.

Independently of this, the seal may have more than two hard components, that is to say for example N hard components, and accordingly more than one, that is to say N≥2 (preferably N in the case of seals extending circumferentially in a closed manner, and preferably N−1 in the case of open seals) connecting soft components which connect the corresponding hard components. A seal which is compact to transport and easy to manufacture can thus be provided, substantially regardless of the size and/or shape of the seal and thus of the housing.

The invention also relates to a housing or a housing component (which can also be referred to as a housing part), in particular of a motor vehicle battery or of a motor vehicle battery box, which has a seal according to one of the described embodiments. In this case, the seal, which in itself is easily bendable at the locations of the soft component and thus as a whole can be folded without being destroyed, is connected to the housing or the housing component by the hard components in a pre-assembled state and is therefore no longer foldable at the connecting soft component(s).

The features and combinations of features mentioned above in the description as well as the features and combinations of features mentioned below in the description of the figures and/or shown in the figures can be used not only in the respectively specified combination, but also in other combinations without departing from the scope of the invention. Thus, embodiments of the invention which are not explicitly shown and explained in the figures but which emerge from the explained embodiments by separate combinations of features, and which can be produced, are also to be regarded as included and disclosed. Embodiments and combinations of features which therefore do not contain all the features of an originally formulated independent or dependent claim are also to be regarded as disclosed. In addition, embodiments and combinations of features which go beyond or deviate from the combinations of features set out in the dependencies of the claims are to be regarded as disclosed, in particular by the embodiments discussed above.

BRIEF DESCRIPTION OF THE DRAWINGS

Exemplary embodiments of the invention will be explained in greater detail below with reference to schematic drawings.

In the drawings.

DETAILED DESCRIPTION

In the figures, components which are the same or which have the same function are provided with the same reference signs.

Figure 1:
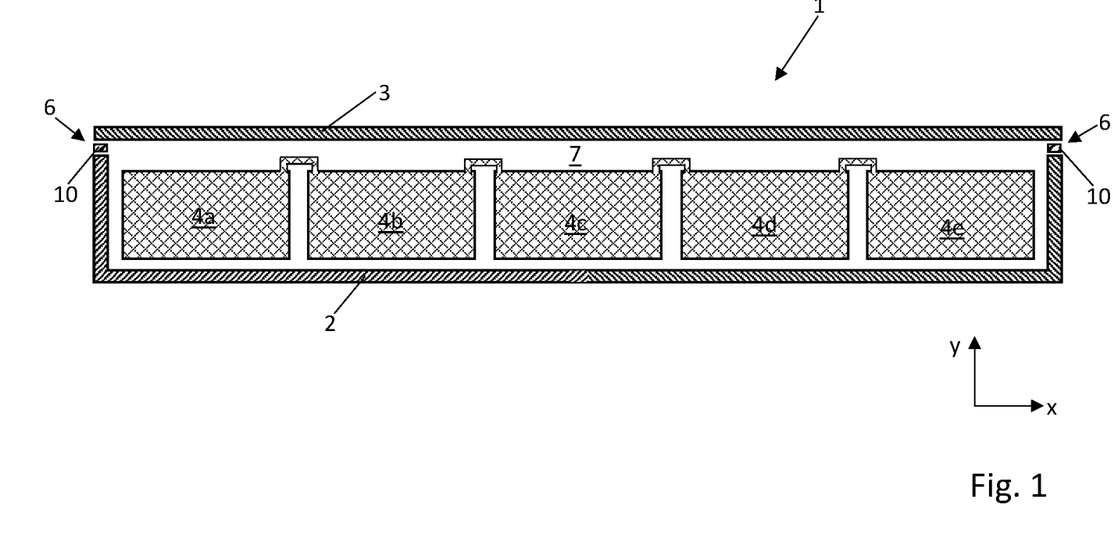
FIG. 1 shows an example housing having battery cells arranged therein and an example seal.

FIG. 1 shows a motor vehicle battery housing as a housing 1 with battery modules 4a to 4e of a vehicle traction battery arranged therein. The housing 1 has a trough as a lower part 2 and a lid as an upper part 3. The battery modules 4a to 4e are housed in an inner chamber 7 of the housing 1. In the present example, the housing 1 has a gap 6 above the battery modules 4a to 4e between the lower part 2 and the upper part 3, this being the gap 6 to be sealed. Accordingly, in the present case, a seal 10 is inserted in the gap 6 in order to seal it. To this end, in the present case, the seal 10 accordingly extends circumferentially around the inner chamber 7 of the housing 1 and, in the example shown, accordingly has an opening 13 (FIG. 2), in which the inner chamber 7 of the trough 2 is located.

Such housings typically have dimensions of more than 1 m at least in the length or width direction or in the length and width direction, so that the seal 10, which is preferably designed as a gasket, typically has a length of several meters in the circumferential direction.

Figure 2:
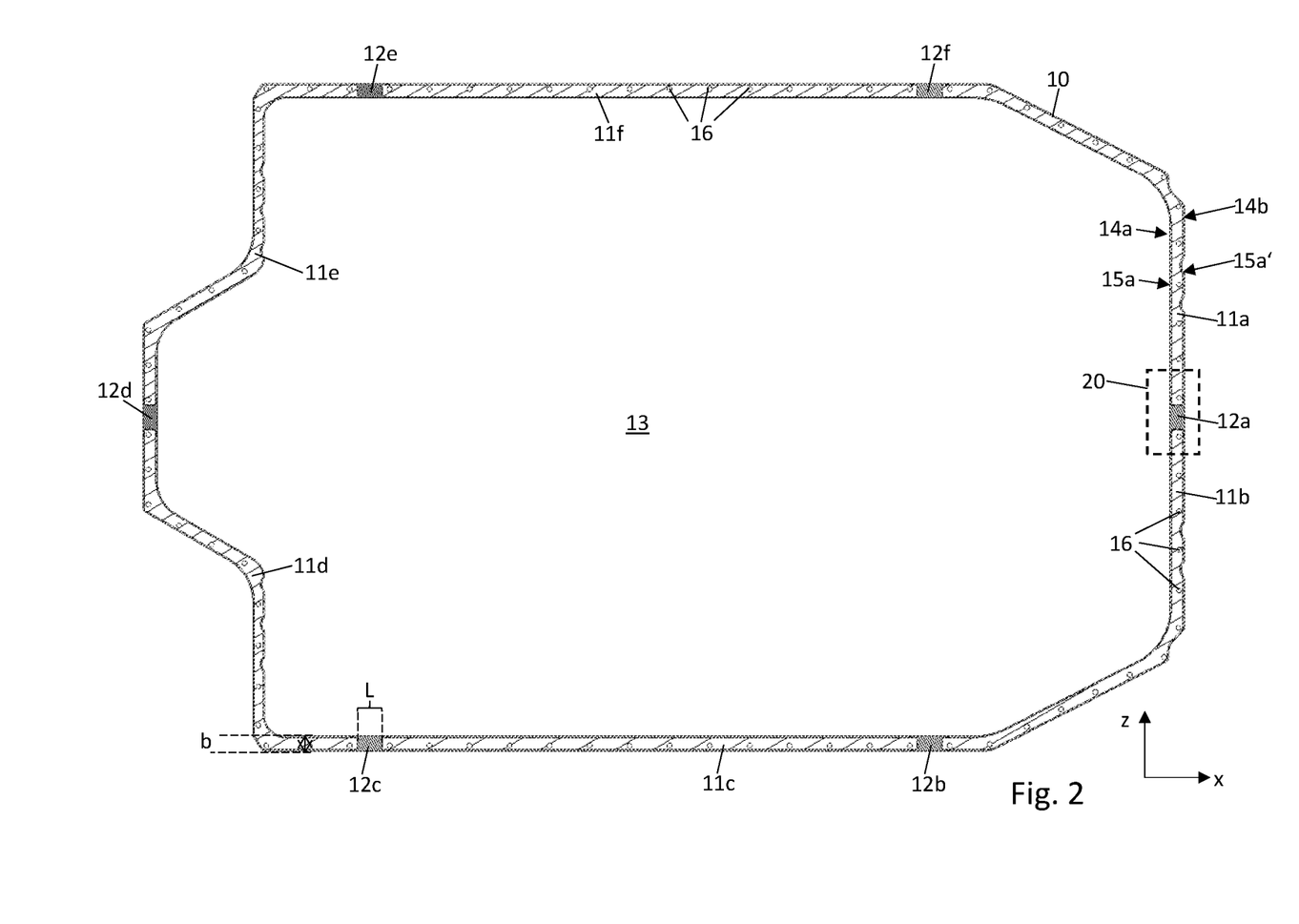
FIG. 2 is a sectional view of an example embodiment of a seal, with a sectional plane parallel to the main extension plane of the seal.

FIG. 2 shows an exemplary embodiment of the seal 10 in a sectional view, wherein the section plane extends parallel to the main extension plane of the seal 10. The present embodiment accordingly has N hard components 11a to 11f and N connecting soft components 12a to 12f, which connect the respective hard components in such a way that in each case two hard components 11a, 11b are connected by one soft component 12a. In the example shown, N=6. In the present case, a seal 10 having an opening 13 is accordingly formed by the identical number of hard and soft components 11a to 11f and 12a to 12f. Such a seal 10 can also be referred to as an annular seal 10. In the present case, the seal 10 has a continuous sealing contour 14a on an inner edge 15a, 15b (FIG. 3A) of the hard components 11a-11f, facing towards the opening 13, and also a further continuous sealing contour 14b on an outer edge 15a', 15b' (FIG. 3A) of the hard components 11a to 11f, facing away from the opening 13. The properties of the continuous sealing contours 14a, 14b of the present example will be explained in greater detail in the following figures with reference to the inner continuous sealing contour 14a.

In the present embodiment, the hard components 11a to 11f also have respective through-openings 16 for suitable fastening means. These may be designed as conventional round holes, as shown, but they may also be specially designed to improve the electromagnetic compatibility, for example such that in the installed state they establish direct metal-metal contact with the fastening means, for example a screw, by virtue of particular roughnesses on their surfaces.

The width b of the seal is constant in many regions. In particular, no significant change in the width b of the seal takes place at the transition from a hard component 11a to 11f to an adjoining soft component 12a to 12f.

Figure 3A:
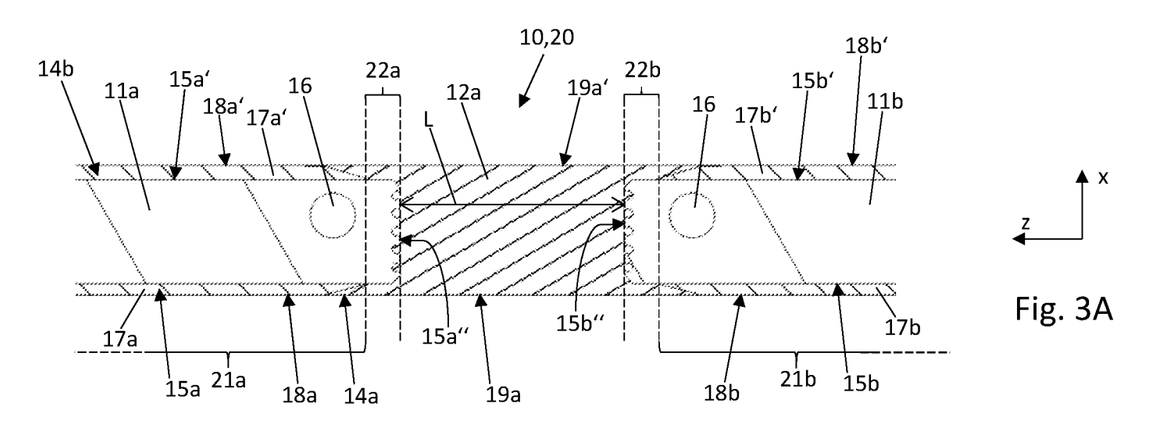
FIG. 3A shows an enlarged portion of the seal from FIG. 2.

FIG. 3A now shows detail 20 from FIG. 2. Here, the two hard components 11a, 11b have the inner edges 15a, 15b and the outer edges 15a', 15b', as well as the end edges 15a" and 15b" oriented in opposite directions with respect to one another. The connecting soft component 12a is arranged between the end edges 15a" and 15b". In the present case, two sealing soft components 17a, 17a' and 17b, 17b' are injection-moulded onto each of the two hard components 11a, 11b, the inner sealing soft components 17a, 17b forming an inner partial sealing contour 18a, 18b and the outer sealing soft components 17a', 17b' forming respective outer partial sealing contours 18a', 18b'. In the present case, an inner partial sealing contour 19a and an outer partial sealing contour 19a' are formed by the connecting soft component 12a. The length L of the connecting soft component 12a refers to the length over which the connecting soft component connects the hard components 11a, 11b; it does not extend into the regions in which the partial sealing contours 19a, 19a' are adjacent to the edges of the hard components 11a, 11b.

The inner partial sealing contours 18a, 18b, 19a, together with the corresponding partial sealing contours of the other soft components, which are assigned to the other hard components 11c to 11f, and with the corresponding inner partial sealing contours of the further connecting soft components 12b to 12f, form the inner continuous sealing contour 14a. Correspondingly, the outer partial sealing contours 18a', 19a' and 18b', together with the partial sealing contours of the further soft components, which are assigned to the further hard components 11c to 11f, and with the outer partial sealing contours of the further soft components 12b to 12f, form the outer sealing contour 14b. In the example shown, the illustrated detail 20 also describes, mutatis mutandis, the other hard components 11c to 11f with the associated sealing soft components and the corresponding connecting soft components 12b to 12f.

In the present case, the sealing soft components 17a, 17a', 17b, 17b' are injection-moulded onto the corresponding inner edges 15a, 15b and outer edges 15a', 15b' of the respective hard components 11a, 11b. Here, the sealing soft components 17a, 17a', 17b, 17b' are injection-moulded along the edges 15a, 15a', 15b, 15b' only over a respective portion 21a, 21b of the respective hard components 11a, 11b, i.e. the sealing soft components 17a, 17a', 17b, 17b' do not extend all the way along the respective edges 15a, 15a', 15b, 15b'. Instead, the connecting soft component 12a is injection-moulded, in the present case directly, onto the remaining residual portions 22a, 22b of the hard components 11a, 11b not covered by the sealing soft components 17a, 17a', 17b, 17b', said connecting soft component also being injection-moulded here directly onto the end edges 15a", 15b". The connecting soft component 12a thus engages around the respective hard components 11a, 11b in the main extension plane of the seal 10, the x-z plane, and is held particularly well on the hard components 11a, 11b. In the example shown, along the course of the seal, i.e. in the present case in the z-direction, the sealing soft components 17a, 17a', 17b, 17b' merge into the connecting soft component 12a not abruptly, i.e. not perpendicular to the z-direction, but instead fluidly, which leads to an improved continuous sealing contour 14a, 14b. The transition will be shown in greater detail in the following figures.

Figure 3B:
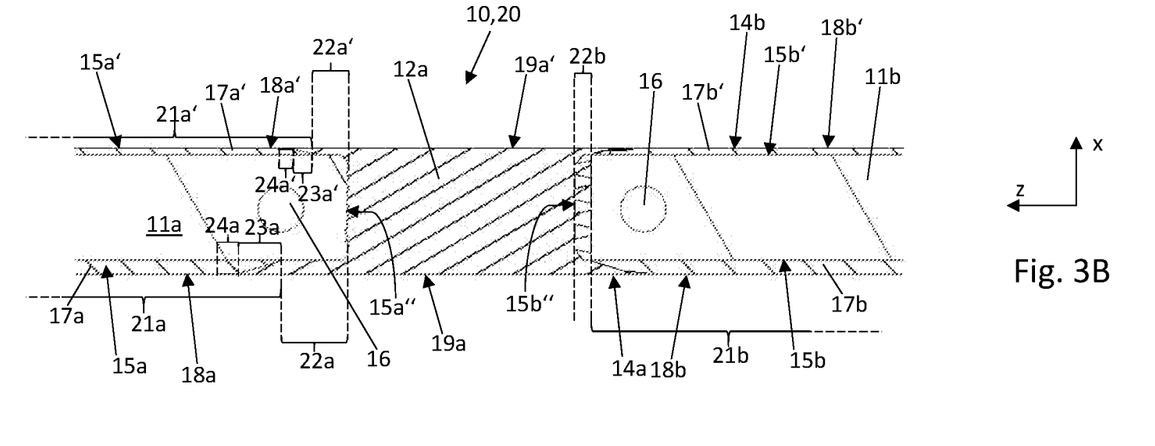
FIG. 3B shows an alternative embodiment of the portion shown in FIG. 3A.

FIG. 3B shows an alternative embodiment of a portion 20 of a gasket 10, as shown in FIG. 3A. Once again, the soft component 12a is also injection-moulded directly onto the end edges 15a", 15b", but the end edges 15a", 15b" are designed differently than in FIG. 3A and also differently from one another. While the end edge 15a" has only a slight structuring, the end edge 15b" is provided with undercuts which are significantly more pronounced than those in FIG. 3A.

While in FIG. 3A the outer sealing contour 14b is approximately one fifth wider than the inner sealing contour 14a, in FIG. 3B the inner sealing contour 14a is approximately twice as wide as the outer sealing contour 14b.

The transition between the partial sealing contours 18b, 18b' of the sealing soft components 17b, 17b' of the hard component 11b and the partial sealing contours 19a, 19a' is substantially identical on the inner sealing contour 14a and on the outer sealing contour 14b; however, the covered residual portions 22b of the hard component 11b are substantially shorter than in the example of FIG. 3A.

The transition between the partial sealing contour 18a of the sealing soft component 17a of the hard component 11a and the partial sealing contour 19a of the inner sealing contour 14a differs considerably from the transition between the partial sealing contour 18a' of the sealing soft component 17a' of the hard component 11a and the partial sealing contour 19a' of the outer sealing contour 14b: the diagonal region 23a is substantially twice as long as the corresponding diagonal region 23a'. In addition, the shell region 24a is substantially twice as long as the shell region 24a'. The covered residual portion 22a of the inner edge 15a is also substantially twice as long as the covered residual portion 22a' of the outer edge 15a'.

Figure 4:
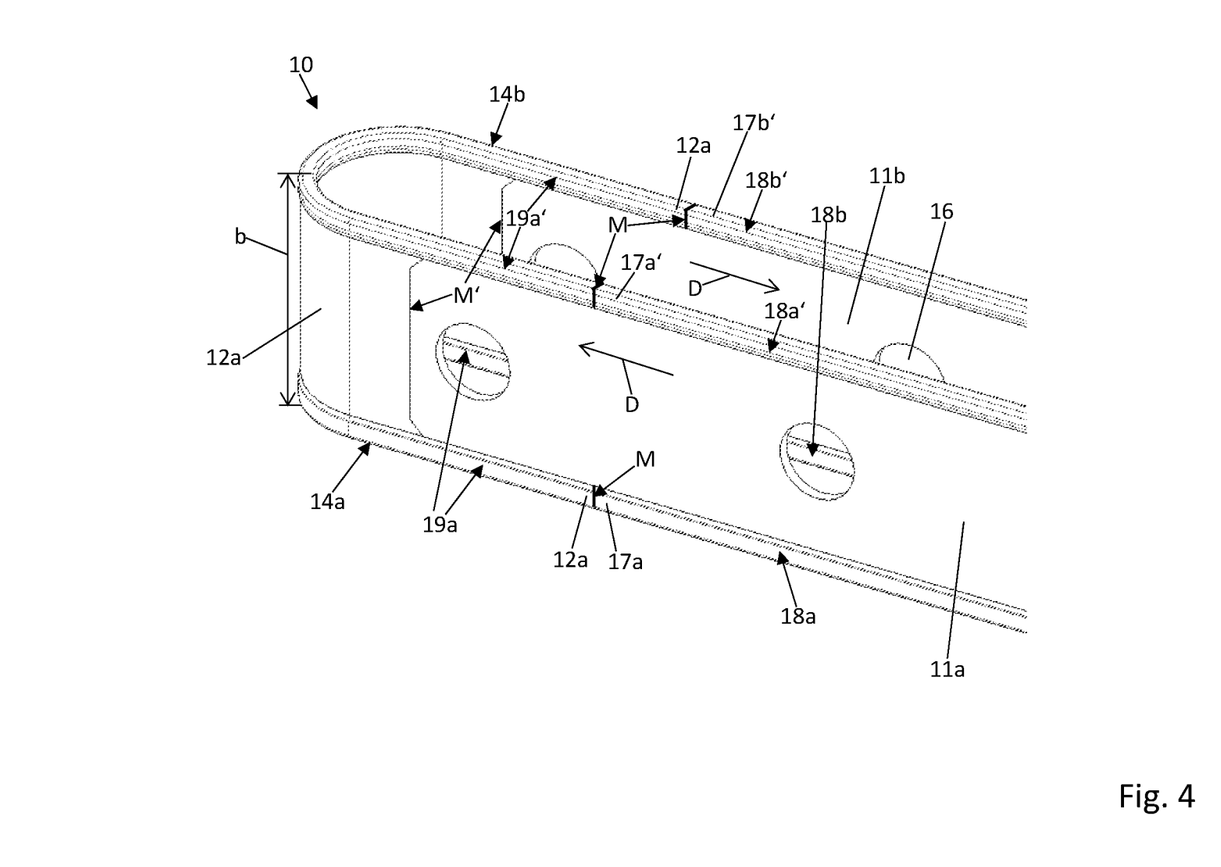
FIG. 4 shows a perspective view of a detail of an exemplary embodiment of a seal in the folded state.

FIG. 4 shows an exemplary perspective view of the described seal in an exemplary folded state. It is particularly clear here that a material transition M between the sealing soft components 17a, 17a', 17b' and the connecting soft component 12a extends transversely to the direction D of the course (course direction D) of the seal, and is offset in the course direction D with respect to a material transition M' between the soft component 12a and the respective hard components 11a, 11b. At least over a large part of the width b of the seal 10, this further material transition M' likewise extends transversely to the course direction D of the seal. Unlike in FIGS. 3A, 3B, the end edges 15a", 15b" here are designed without any undercuts.

Figure 5:
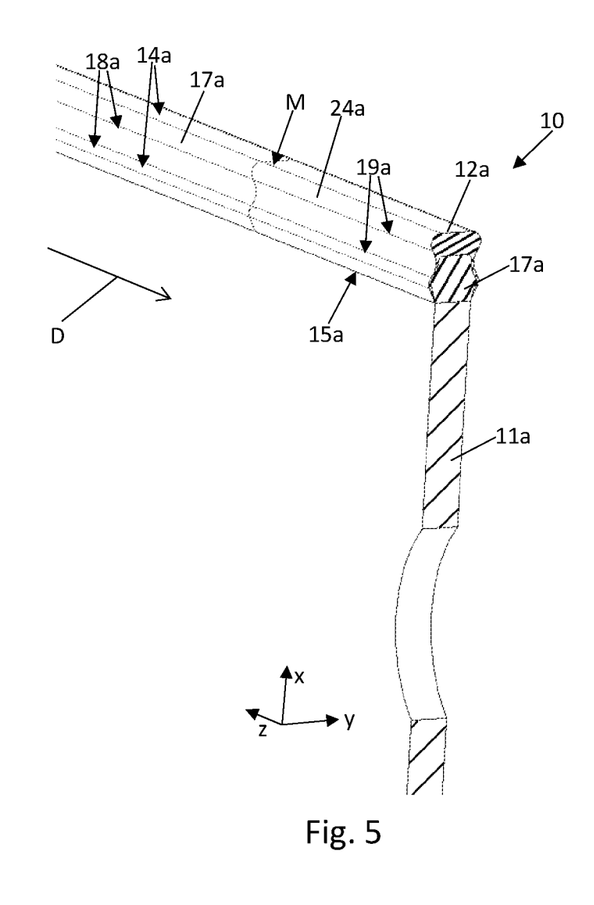
FIG. 5 is a perspective view of the example embodiment of a seal, with a sectional plane extending perpendicularly to the main extension plane.

FIG. 5 shows a perspective sectional view of the seal 10. Here, the section plane extends perpendicular to the main extension plane of the seal, i.e. perpendicular to the x-z plane, and perpendicular to the course direction D of the seal 10. In the present example, for better connection to the sealing soft component 17a, the connecting soft component 12a is injection-moulded partially around the sealing soft component 17a along the edge 15a. The section shown is thus situated in the shell region 24a, see also FIG. 3B. The sealing soft component 17a is therefore no longer visible from outside after the visible material transition M in the course direction D, but continues below the connecting soft component 12a in the direction of the end edge 15a" (FIG. 3A) of the hard component 11a in order thus to achieve an improved service life and sealing performance. Such a transition is possible not only in the case of a double profile of the sealing contour, as shown here, but also in the case of a single profile of the sealing contour or some other differently designed profile of the sealing contour.

Figure 6:
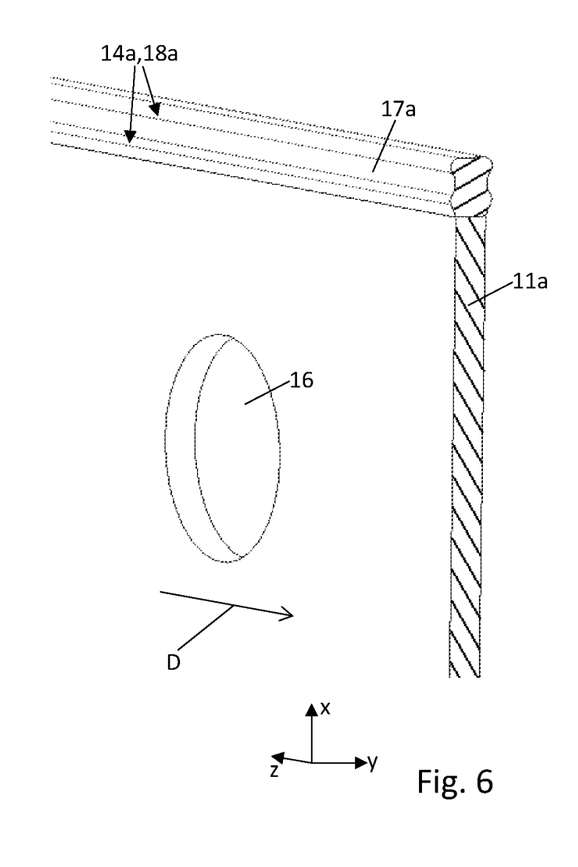
FIG. 6 shows a further perspective view of the seal from FIG. 5 with a section plane shifted along the course of the seal.

FIG. 6 shows a perspective sectional view corresponding to FIG. 5, but the section plane is shifted in the direction opposite the course direction D of the seal. The connecting soft component 12a (FIG. 5) can thus no longer be seen here; only the hard component 11a with the sealing soft component 17a applied thereto and the sealing contour 14a, 18a is present in the illustrated portion of the seal 10.

Figure 7:
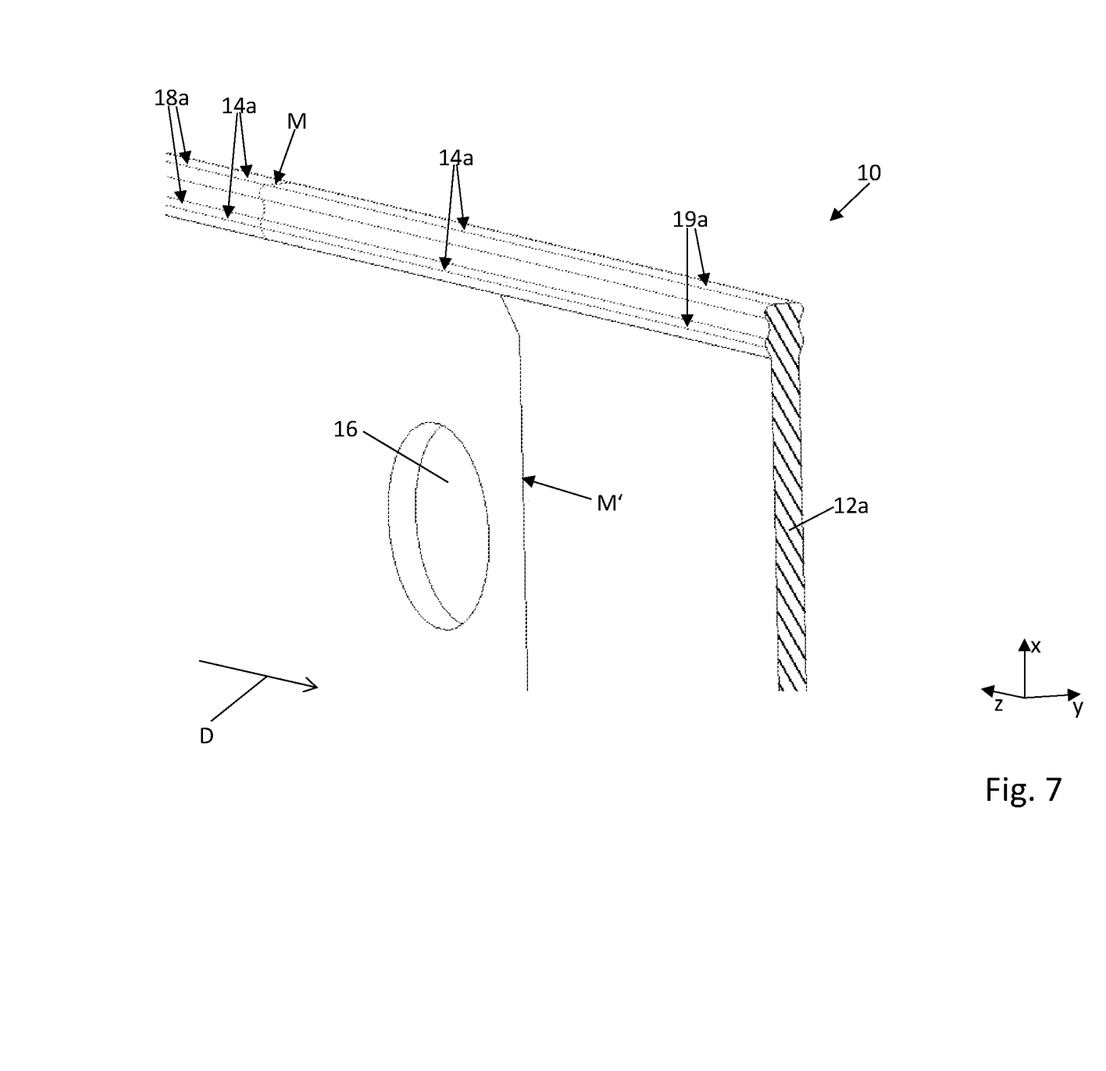
FIG. 7 shows a further perspective sectional view of the example of FIG. 5 with a section plane shifted again in comparison to the diagram of FIG. 6.

Finally, FIG. 7 shows a corresponding perspective sectional view with a section plane shifted in the positive course direction D of the seal in comparison to FIG. 5. Here, only the connecting soft component 12a can be seen on the section face; the seal 10 is therefore formed entirely by the second soft component 12a, even in the region of the partial sealing contour 19a, and not partially by the connecting soft component 12a and partially by the sealing soft component 17a as shown in FIG. 5.

Figure 8:
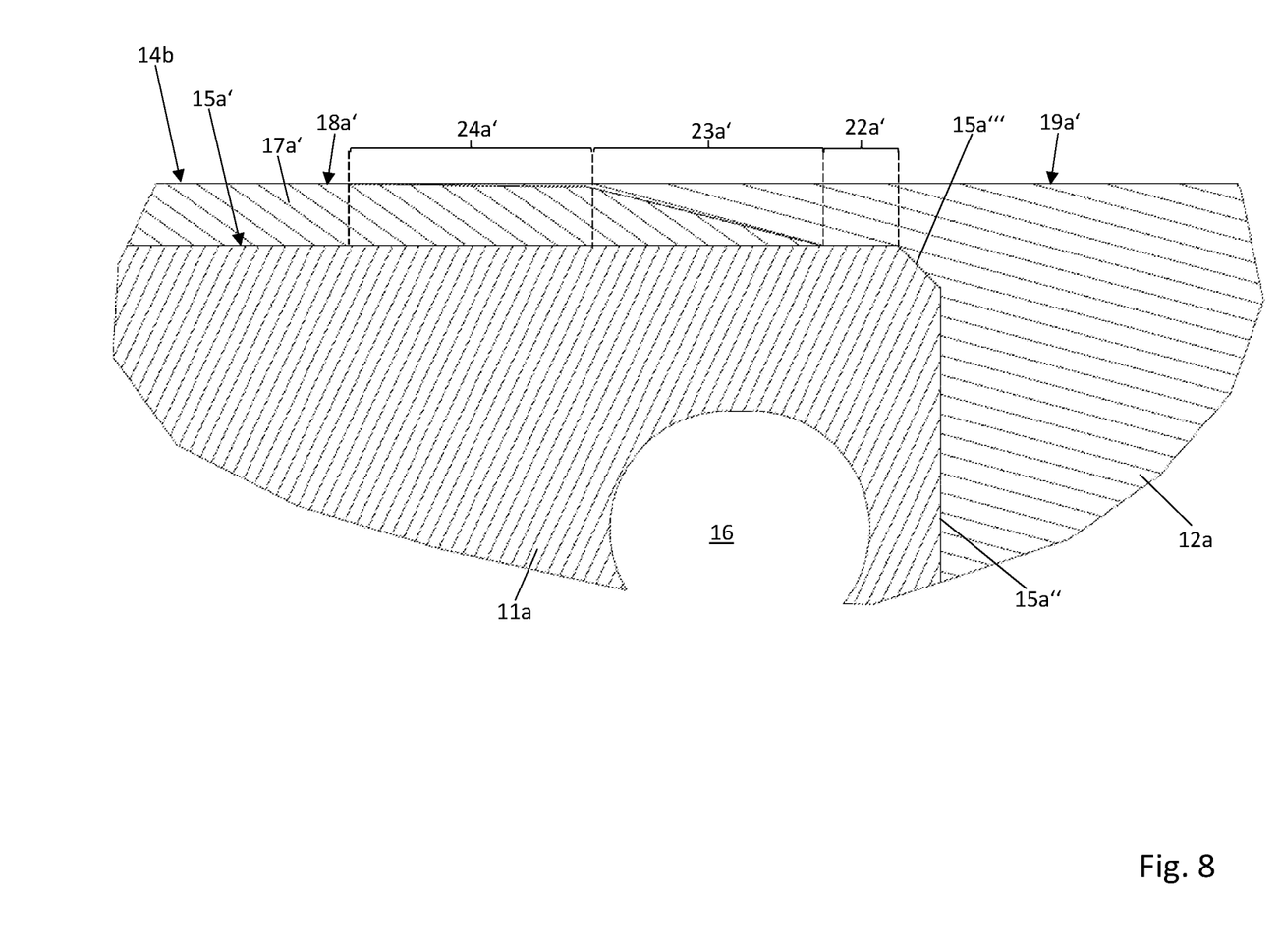
FIG. 8 shows a detail view of a sealing contour.

FIG. 8 shows a section through a portion of a gasket 10. The diagram illustrates, from right to left, the transition from the exclusively connecting part of the connecting soft component 12a to a hard component 11a, in which the partial sealing contour 19a in the extreme left-hand region is formed exclusively by the sealing soft component 17a'. The connecting soft component surrounds the end edge 15a", follows the diagonal edge 15a, and then extends over a few millimeters in the covered residual portion 22a' of the outer edge 15a', wherein the connecting soft component 12a in the covered residual portion 22a' consists exclusively of the partial sealing contour 19a. In contrast, in the diagonal region 23a', the sealing soft component 17a' is applied to the outer edge 15a', in particular by injection moulding. In this diagonal region 23a', the connecting soft component 12a is not applied to the outer edge 15a', but rather to the sealing soft component 17a'; here, the proportion of the sealing soft component 17a' constantly increases towards the left, and the proportion of the connecting soft component 12a constantly decreases. By contrast, the sealing contour 14b does not change its profile shape in this diagonal region. In the shell region adjoining to the left, the connecting soft component 12a now surrounds the sealing soft component 17a' only in a shell-like manner, the thickness of the skin thus formed further decreasing towards the left so that, to the left of the shell region, the sealing soft component 17a' is exposed and on its own forms the partial sealing contour 18a'.

Figures 9A, 9B, 9C:
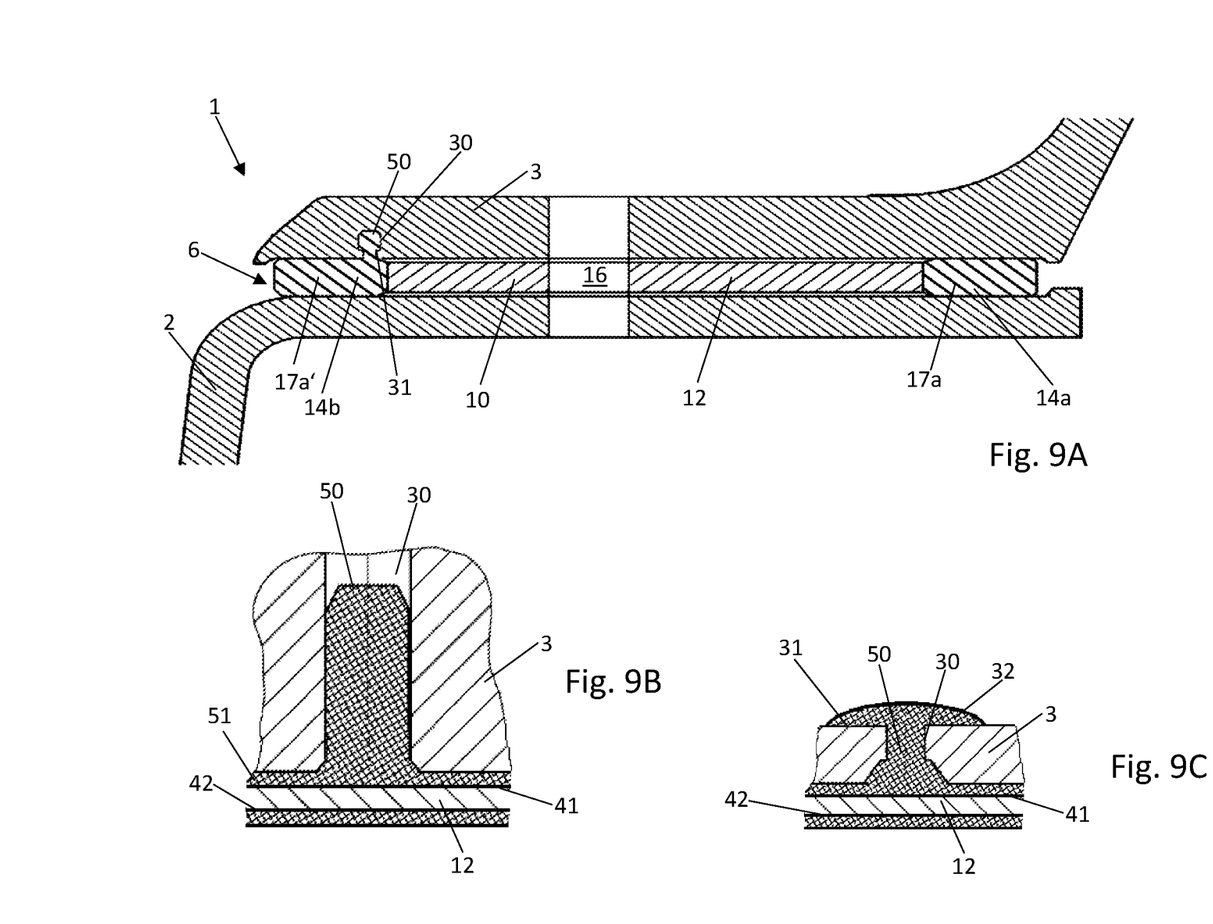
FIG. 9 shows, in five sub-FIGS. 9A, 9B, 9C, 9D and 9E, embodiments of a seal with pre-assembly elements.
Figure 9D:
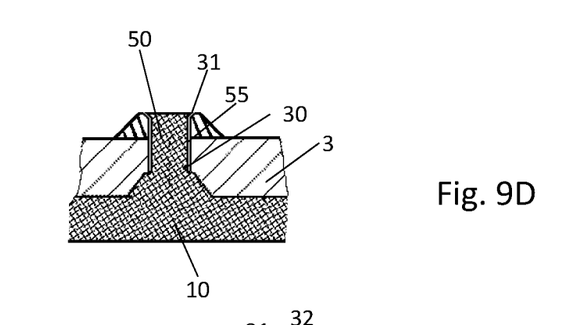
Figure 9E:
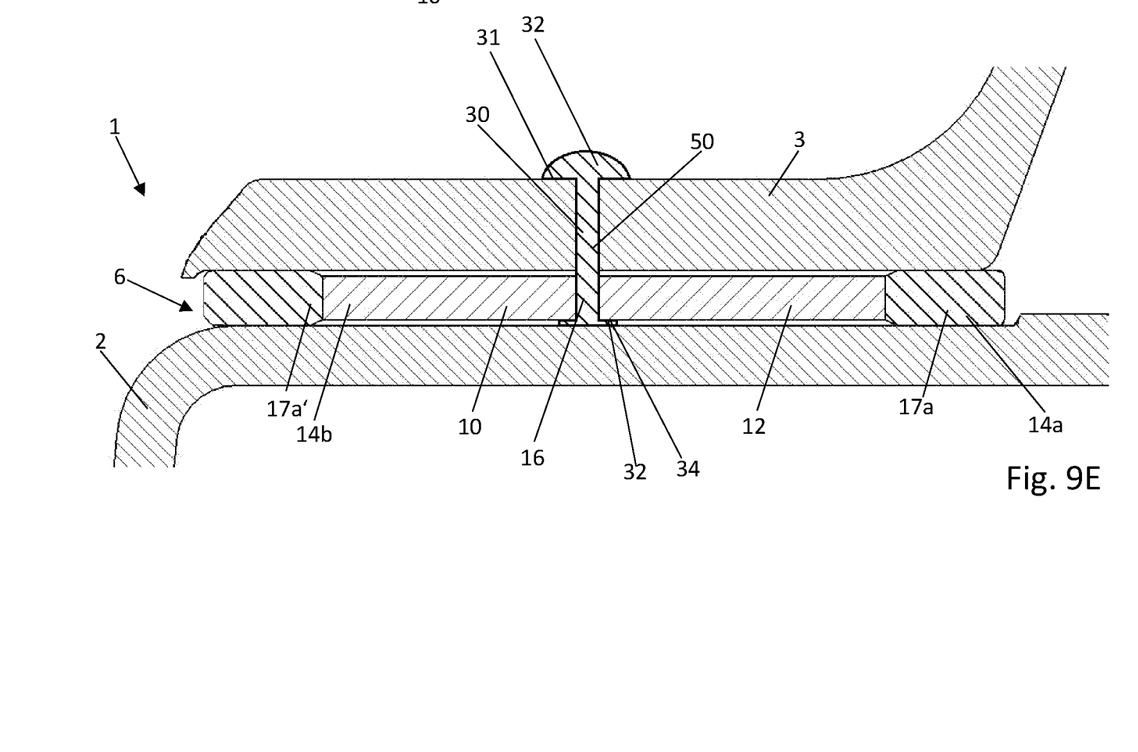

FIG. 9 shows, in four sub-FIGS. 9A, 9B, 9C and 9D, sectional views (FIG. 9A) of seals 10 and portions (FIGS. 9B, 9C, 6D) thereof, in which the seal in each case has an integral pre-assembly element 50. A further sub-FIG. 9E shows a sectional view of a seal, in which a separately formed pre-assembly element is received.

In this regard, FIG. 9A shows a seal 10 with two sealing contours 14a, 14b which is installed in a gap 6 between a lid 3 and a trough 2. From the outer sealing contour 14b, a projection extends as a pre-assembly element 50 in the direction of the lid 3, said projection being received in a cutout 30 therein and being prevented from being easily detached by means of an undercut 31.

FIG. 9B once again shows a pre-assembly element 50 which is received in a cutout 30 of the lid 3, the cutout here being open in the upward direction. In a manner differing from the example of FIG. 9A, the pre-assembly element 50 now extends not in the region of the sealing soft component 17a' of the sealing contour 14b, but instead in the region of the hard component 12. The latter in this case has a coating on both surfaces 41, 42, which not visible continues in one piece from the sealing soft component. The projection now extends here in one piece from this coating and is held in a clamped manner in the cutout 30.

FIG. 9C shows a similar pre-assembly element 50 to that of FIG. 9B, wherein here the pre-assembly element 50 protrudes beyond the lid 3 and bears with a mushroom-shaped head 32 against the outer surface of the lid 3 and is thus held.

FIG. 9D shows a pre-assembly element 50 which per se is formed entirely from the soft component. It may be formed both from the connecting soft component and from the sealing soft component and thus, like the exemplary embodiment of FIG. 9A, may be designed as a projection of a sealing contour or may extend in the direction of the lid 3 from a portion of the connecting soft component that connects two end edges. The undercut 31 is cantilevered only so far that on the one hand easy insertion into the through-openings 16, 30 is possible and on the other hand the additional, substantially annular fastening element 55 can be durably held.

Like FIG. 9A, FIG. 9E shows a seal 10 with two sealing contours 14a, 14b which is installed in a gap 6 between a lid 3 and a trough 2. A through-opening 16 is provided in the hard component 12, and a through-opening 30 is provided in the lid 3. A pre-assembly element 50 is guided through these two through-openings 16, 30, which pre-assembly element has a head 32 with an undercut 31 on the upper side of the lid 3, and a foot 33 with an undercut 34 on the underside of the seal 10 facing towards the trough 2. The two undercuts 31, 34 prevent detachment of the pre-assembly element 50 from the seal 10 and the lid 3. Both the head 32 and the foot 33 are not cantilevered all the way round, and therefore easy assembly is possible by inserting and rotating the pre-assembly element 50.

The invention claimed is:

1. A seal for sealing a gap in a housing that extends around an inner chamber of the housing, the seal comprising at least one sealing layer, and the sealing layer comprising:
   at least two hard components connected by a connecting soft component, an end of at least one of the hard components comprising cuts, and an end of the connecting soft component mating with the cuts, and the connecting soft component being soft in comparison to the hard components,
   one or more sealing soft components forming a sealing contour on a side of the hard components; and
   the connecting soft component forming a sealing contour, the sealing contour formed by the connecting soft component and the sealing contour formed by the one or more sealing soft components connecting to form a continuous sealing contour, and a material transition between one of the one or more sealing soft components and the connecting soft component is offset in a direction of extension of a course of the seal from a material transition between the hard component and the connecting soft component.

2. The seal according to claim 1, wherein the one or more sealing soft components are applied to the associated hard component by an injection moulding process, and the connecting soft component is applied to both hard components and/or to the one or more sealing soft components by an injection moulding process.

3. The seal according to claim 1, wherein the hard components comprise one or more of metal, thermoplastic, and thermoset, and the soft components comprise elastomer.

4. The seal according to claim 3, wherein the elastomer comprises one or more of: NBR (acrylonitrile butadiene rubber), EPDM (ethylene propylene diene rubber), EVM (ethyl-vinyl acetate copolymer), ACM (polyacrylate rubber), AEM (ethylene acrylate rubber), HNBR (hydrogenated acrylonitrile butadiene rubber), VMQ (vinyl methyl silicone), PMQ (phenyl silicone), PVMQ (phenyl vinyl methyl silicone), FVMQ (fluoro vinyl methyl silicone), and FKM (fluoropolymer rubber).

5. The seal according to claim 3, wherein the thermoplastic comprises one or more of: polyphenylene sulphide (PPS), polyetherimide (PEI), polyimide (PI), polyphthalamide (PPA), polyether ether ketone (PEEK), and polyamide (PA).

6. The seal according to claim 3, wherein the thermoset comprises one or more of: polyester resin (UP), vinyl ester resin (VE), epoxy resin (EP), phenolic resin (PF), and melamine formaldehyde resin (MF).

7. The seal according to claim 1, wherein the hard components are flat, and the partial sealing contours formed by the one or more sealing soft components extend along an edge of the associated hard component only over a portion of the edge, and the partial sealing contour formed by the connecting soft component extends along the edge over a remaining residual portion of the edge.

8. The seal according to claim 1, wherein a material transition between the hard component and the connecting soft component and/or a material transition between the connecting soft component and the one or more sealing soft components extends at an angle less than 60° relative to the course of the continuous sealing contour and/or relative to the main extension plane of the seal.

9. The seal according to claim 1, wherein a length of the connecting soft component is at least 20 mm.

10. The seal according to claim 1, wherein a thickness of the sealing layer in the region of the sealing contours is between 1.5 mm and 4.4 mm, and/or a thickness of the sealing layer in the region outside of the sealing contours, is between 1.0 mm and 2.0 mm for a hard component made of steel.

11. The seal according to claim 1, wherein a thickness of the connecting soft component outside of the sealing contours is between 50% and 110% of the thickness of the hard component.

12. The seal according to claim 1, wherein the hard component has a plurality of through-openings for respective fasteners.

13. The seal according to claim 1, wherein the sealing layer extends around an opening of the seal and/or around the inner chamber of the housing, and
the sealing layer comprises at least two connecting soft components, so that the continuous sealing contour extends around the opening of the seal and/or the inner chamber of the housing.

14. The seal according to claim 1, wherein the width of the seal changes over the course of the seal at most such that the narrowest portion has a width that is at least 50% of the width of the widest portion.

15. A housing or housing component, comprising the seal according to claim 1.

16. The seal according to claim 1, wherein the cuts in the end of the at least one of the hard components are shaped as undercuts and the edge of the connecting soft component engages with the undercuts.

17. The seal according to claim 1, wherein an end of a first of the at least two hard components is separated from an end of a second of the at least two hard components by a length of the connecting soft component.

* * * * *